United States Patent
Mizuo

(10) Patent No.: US 10,868,480 B2
(45) Date of Patent: Dec. 15, 2020

(54) MOTOR DRIVING APPARATUS, MOTOR SYSTEM INCLUDING THE SAME, IMAGING APPARATUS, AND MOTOR DRIVING METHOD

(71) Applicant: CANON KABUSHIKI KAISHA, Tokyo (JP)

(72) Inventor: Yoshihiro Mizuo, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/158,055

(22) Filed: Oct. 11, 2018

(65) Prior Publication Data

US 2019/0123666 A1 Apr. 25, 2019

(30) Foreign Application Priority Data

Oct. 25, 2017 (JP) .................. 2017-206380

(51) Int. Cl.
*H02P 6/15* (2016.01)
*G01D 5/14* (2006.01)
*G01D 5/245* (2006.01)

(52) U.S. Cl.
CPC ............. *H02P 6/153* (2016.02); *G01D 5/145* (2013.01); *G01D 5/2451* (2013.01)

(58) Field of Classification Search
CPC .................. H02P 6/153; G01D 5/145
See application file for complete search history.

(56) References Cited

U.S. PATENT DOCUMENTS

| | | | |
|---|---|---|---|
| 2011/0087456 A1* | 4/2011 | Satou | B62D 15/0235 702/151 |
| 2013/0002178 A1* | 1/2013 | Endou | H02P 6/153 318/400.11 |
| 2014/0035496 A1* | 2/2014 | Mizuo | H02P 8/18 318/400.17 |
| 2014/0239854 A1* | 8/2014 | Suzuki | H02P 5/68 318/35 |

FOREIGN PATENT DOCUMENTS

| | | |
|---|---|---|
| JP | 2014-45646 A | 3/2014 |
| JP | 2016-154422 A | 8/2016 |

* cited by examiner

*Primary Examiner* — Kawing Chan
*Assistant Examiner* — Bradley R Brown
(74) *Attorney, Agent, or Firm* — Canon U.S.A., Inc. IP Division

(57) ABSTRACT

An apparatus includes at least one processor or circuit programmed to function as a detection unit that detects a rotational position of a rotor, and a generation unit that generates a driving waveform for a motor based on the detected rotational position. The generation unit includes a phase difference setting unit that sets a phase difference between the rotational position and the driving waveform, a changing time setting unit that sets a changing time, which is a time required for changing the phase difference from a phase difference before the change to a phase difference after the change, in a case where the set phase difference is changed, and a determination unit that determines a phase of the driving waveform based on the phase difference before the change, the phase difference after the change, and the changing time.

21 Claims, 13 Drawing Sheets

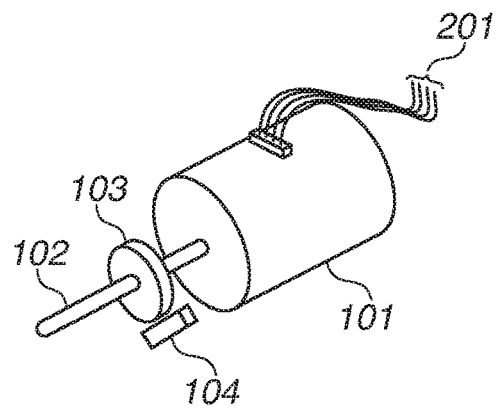
FIG.2A
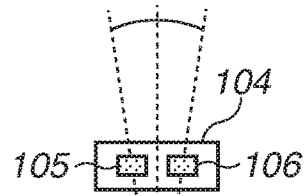
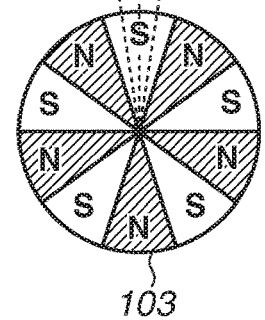
FIG.2B
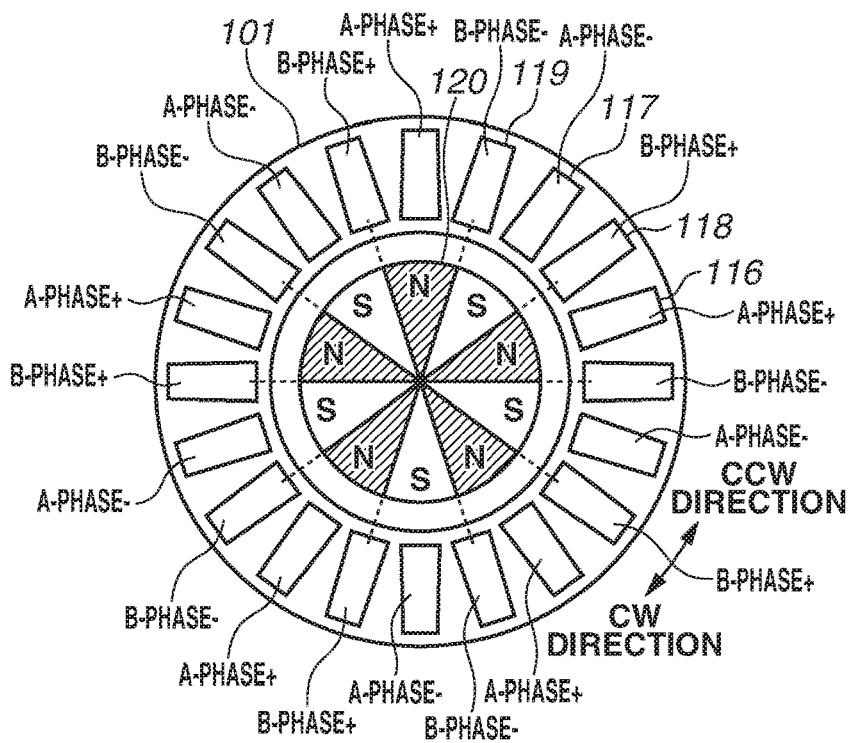
FIG.2C

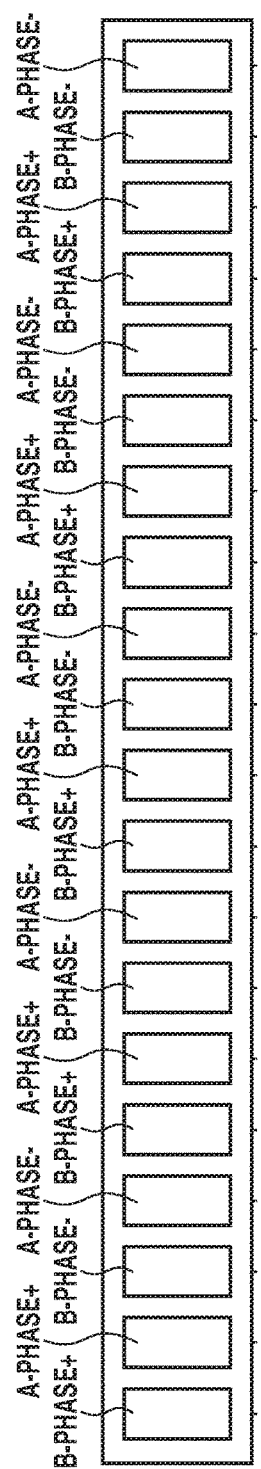
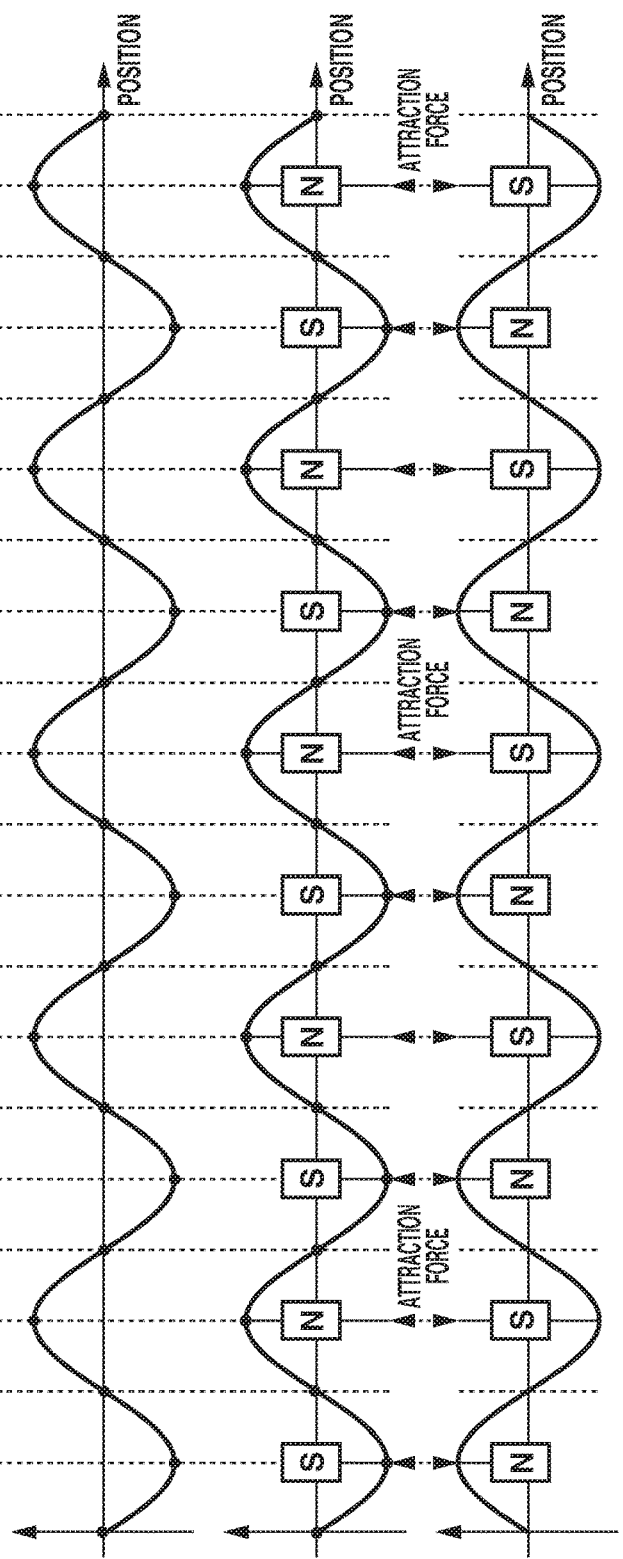
FIG.7A FIG.7B FIG.7C FIG.7D

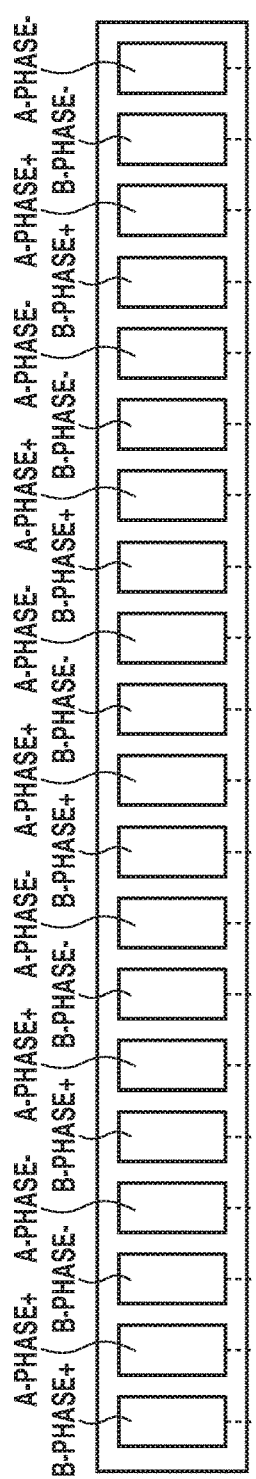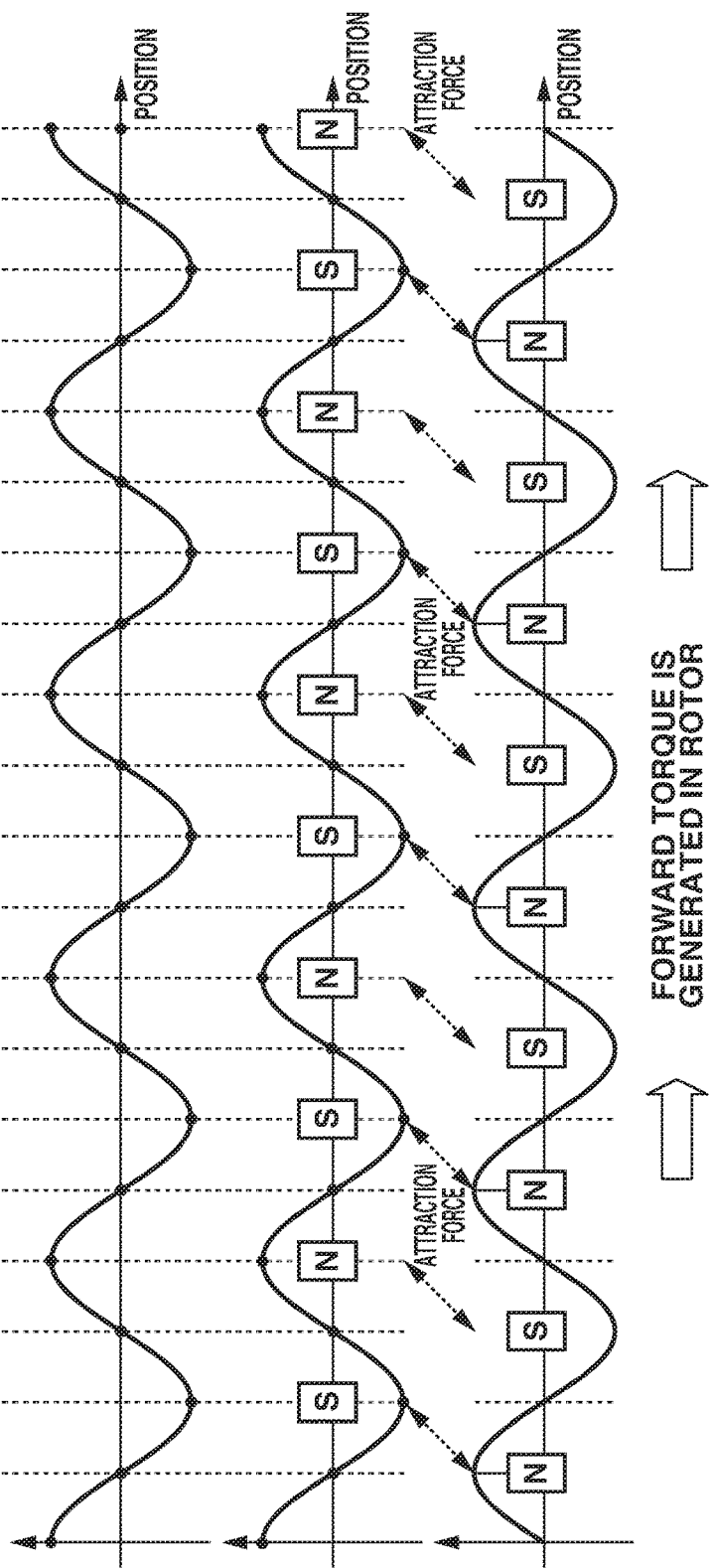

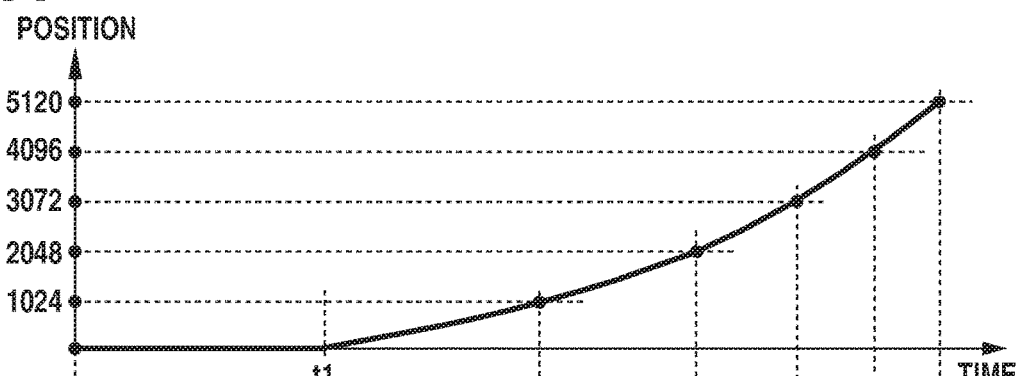
FIG.9A
FIG.9B
FIG.9C
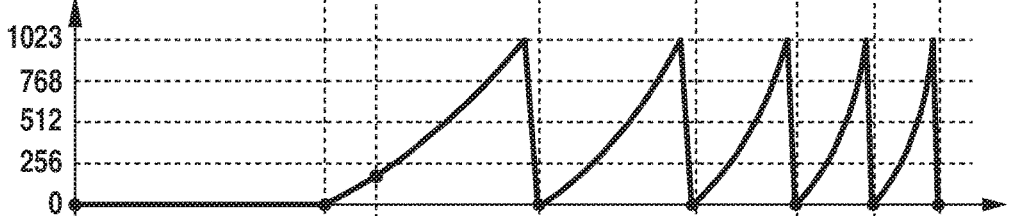
FIG.9D
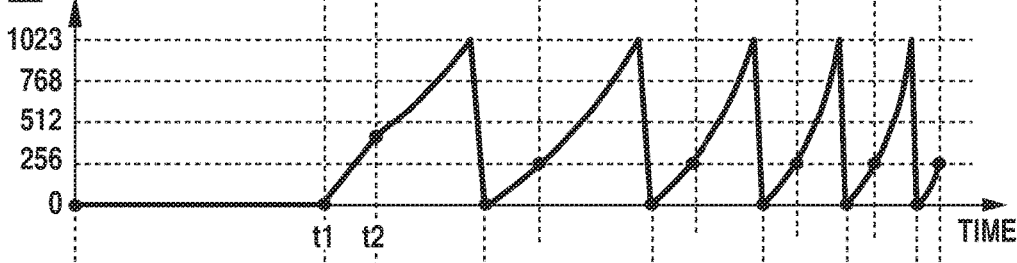
FIG.9E
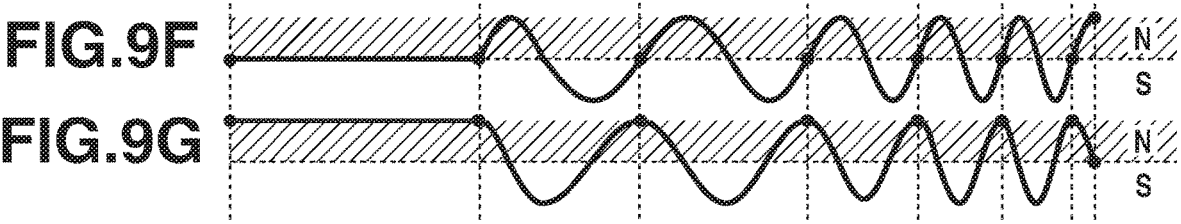
FIG.9F
FIG.9G

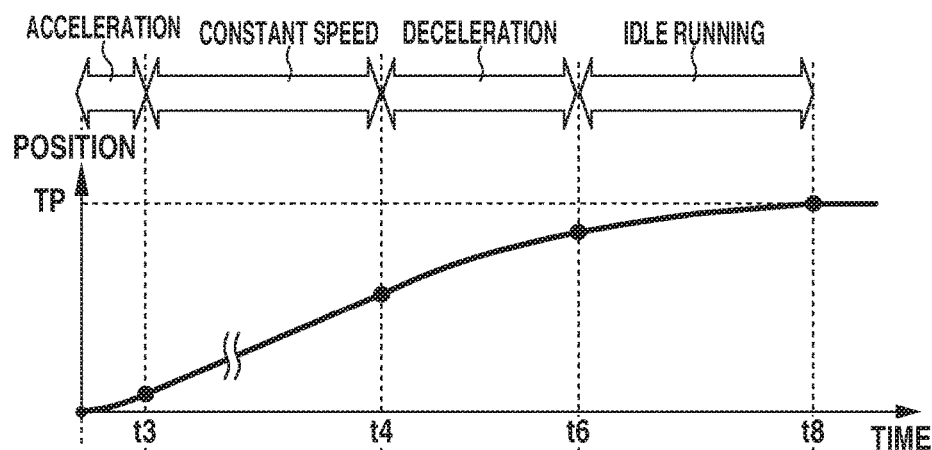
FIG.10A
FIG.10B
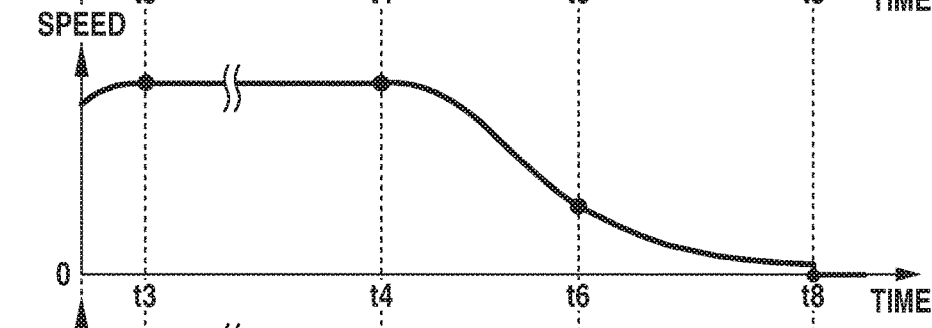
FIG.10C
FIG.10D
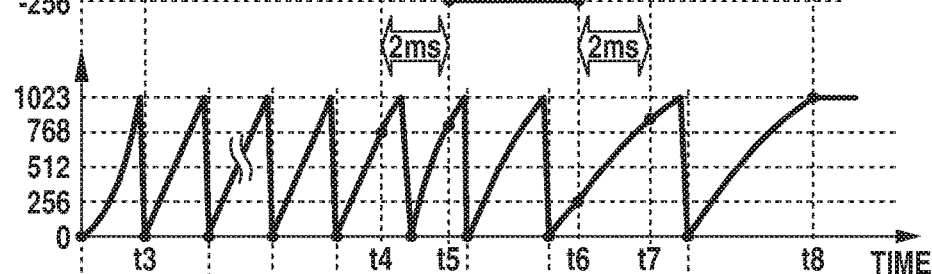
FIG.10E
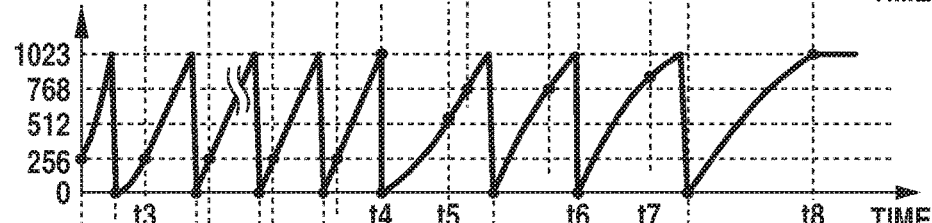
FIG.10F
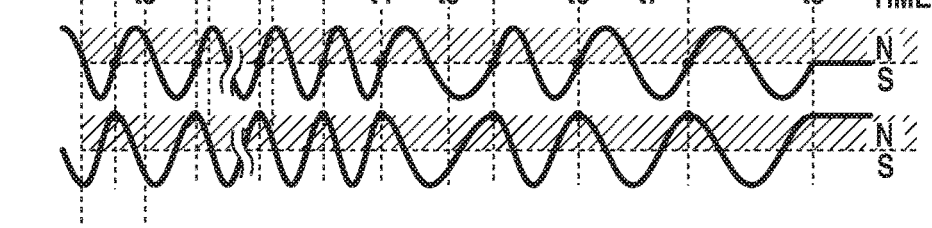
FIG.10G
FIG.10H

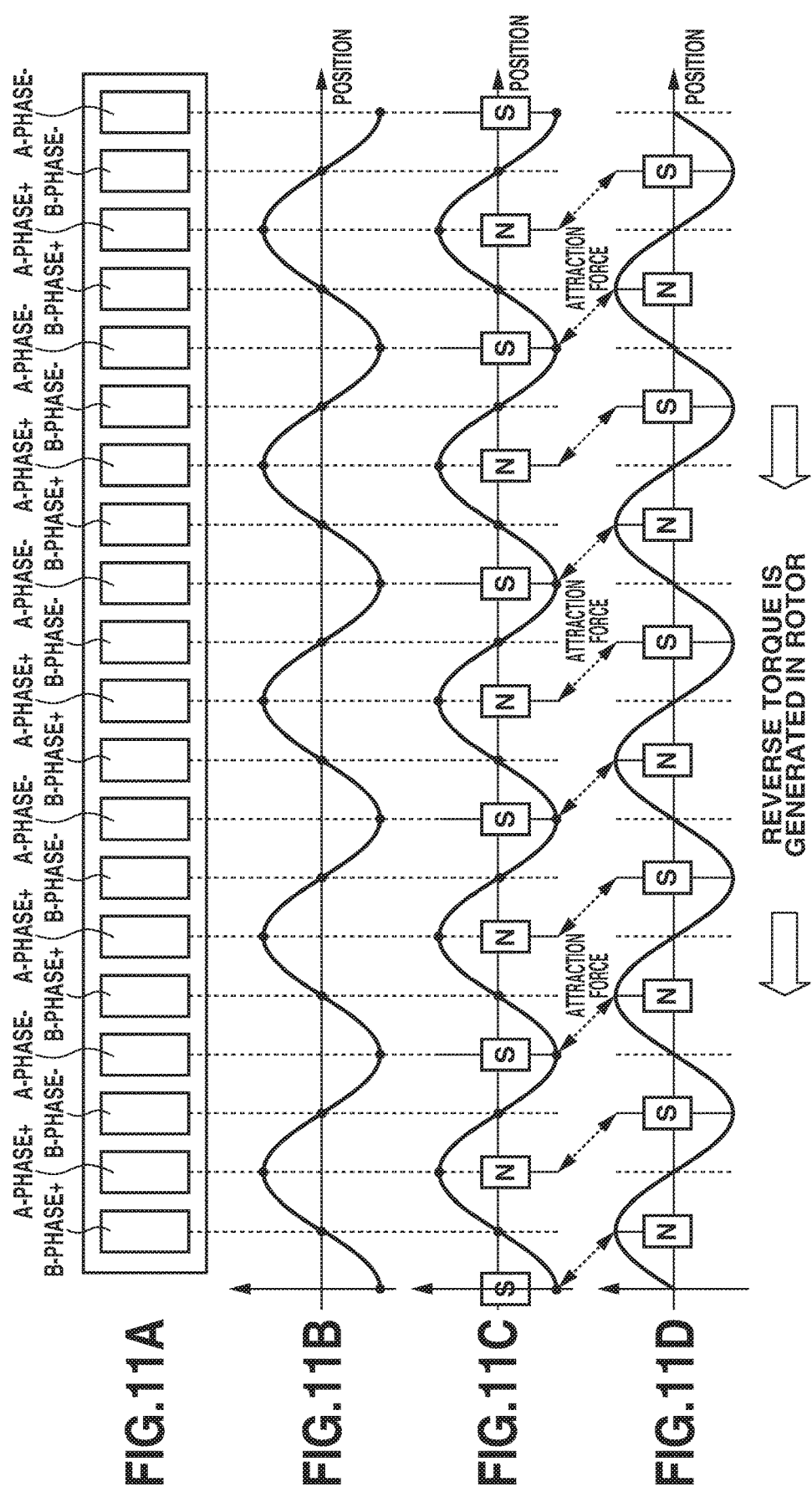

MOTOR DRIVING APPARATUS, MOTOR SYSTEM INCLUDING THE SAME, IMAGING APPARATUS, AND MOTOR DRIVING METHOD

BACKGROUND OF THE INVENTION

Field of the Invention

The aspect of the embodiments relates to a motor driving technique for applying a driving waveform to a rotor.

Description of the Related Art

There is a technique for achieving efficient rotational driving by detecting a rotational position of a motor using a rotational position detection mechanism provided to a rotating shaft of the motor and by applying a driving waveform to the motor. An apparatus discussed in Japanese Patent Application Laid-Open No. 2014-45646 includes a motor configured to include a magnet placed on a rotor side and a coil winding placed on a stator side, and generates a sine wave driving signal in an efficient phase using a low-resolution square wave position detection sensor. Japanese Patent Application Laid-Open No. 2016-154422 discusses a technique for improving a square wave change resolution of a position detector. This is a technique for, in a case where a relationship between a rotor detection phase and a driving waveform phase deviates from a target phase relationship, compensating for an amount of deviation to improve efficiency of rotational driving.

The conventional technique is a technique for, based on an ideal phase relationship between a rotor rotational phase and a driving waveform phase as a configuration, detecting that a positional relationship is different from an ideal state, and then performing a compensation process. Thus, there is a delay in response from the time when the difference is detected to the time when the compensation process is completed. If a delay time is long, there is a possibility that when acceleration or deceleration is performed or when a disturbance occurs, a mechanism portion cannot fulfill its responsive potential.

As a method for increasing accuracy of a position detection mechanism portion, there is a method for enhancing a resolution of a square wave signal. In this method, due to frequency characteristics of the signal, there is a possibility that a position cannot be detected unless a sufficient detection result of a change in the square wave signal is obtained during high speed rotation. In addition, when an instruction value of the phase relationship between the rotor rotational phase and the driving waveform phase is changed, there is a possibility that continuity of the driving waveform is impaired, and the driving waveform becomes discontinuous, thereby causing vibration and noise in a motor.

SUMMARY OF THE INVENTION

An apparatus includes at least one processor or circuit programmed to function as a detection unit configured to detect a rotational position of a rotor, and a generation unit configured to generate a driving waveform for a motor based on the detected rotational position, wherein the generation unit includes a phase difference setting unit configured to set a phase difference between the rotational position and the driving waveform, a changing time setting unit configured to set a changing time, which is a time required for changing the phase difference from a phase difference before the change to a phase difference after the change, in a case where the set phase difference is changed, and a determination unit configured to determine a phase of the driving waveform based on the phase difference before the change, the phase difference after the change, and the changing time.

Further features of the disclosure will become apparent from the following description of exemplary embodiments with reference to the attached drawings.

BRIEF DESCRIPTION OF THE DRAWINGS

FIGS. 2A, 2B, and 2C are diagrams schematically illustrating a position detection structure in a motor according to each of the first exemplary embodiment and a second exemplary embodiment.

FIGS. 7A, 7B, 7C, and 7D are diagrams illustrating a state where a rotor magnet phase and a driving waveform phase are in a stable stop relationship.

FIGS. 8A, 8B, 8C, and 8D are diagrams illustrating a state where the rotor magnet phase and the driving waveform phase are in a relationship of generating a forward torque.

FIGS. 9A, 9B, 9C, 9D, 9E, 9F, and 9G are graphs illustrating behavior of the motor when the motor is accelerated.

FIGS. 10A, 10B, 10C, 10D, 10E, 10F, 10G, and 10H are graphs illustrating behavior of the motor when the motor is driven at a constant speed, is decelerated, and stops.

FIGS. 11A, 11B, 11C, and 11D are diagrams illustrating a state where the rotor magnet phase and the driving waveform phase are in a relationship of generating a revere torque.

DESCRIPTION OF THE EMBODIMENTS

Exemplary embodiments of the disclosure will be described in detail below based on the attached drawings. A motor driving apparatus according to each of first and second exemplary embodiments is applicable to various apparatuses such as an imaging apparatus, an optical disc apparatus, a printer, and a projector. For example, in a case where the motor driving apparatus is applied to an imaging apparatus, the motor driving apparatus can be used for driving various optical devices such as a zoom lens, a focus lens, an optical diaphragm, and a shutter.

Figure 1:
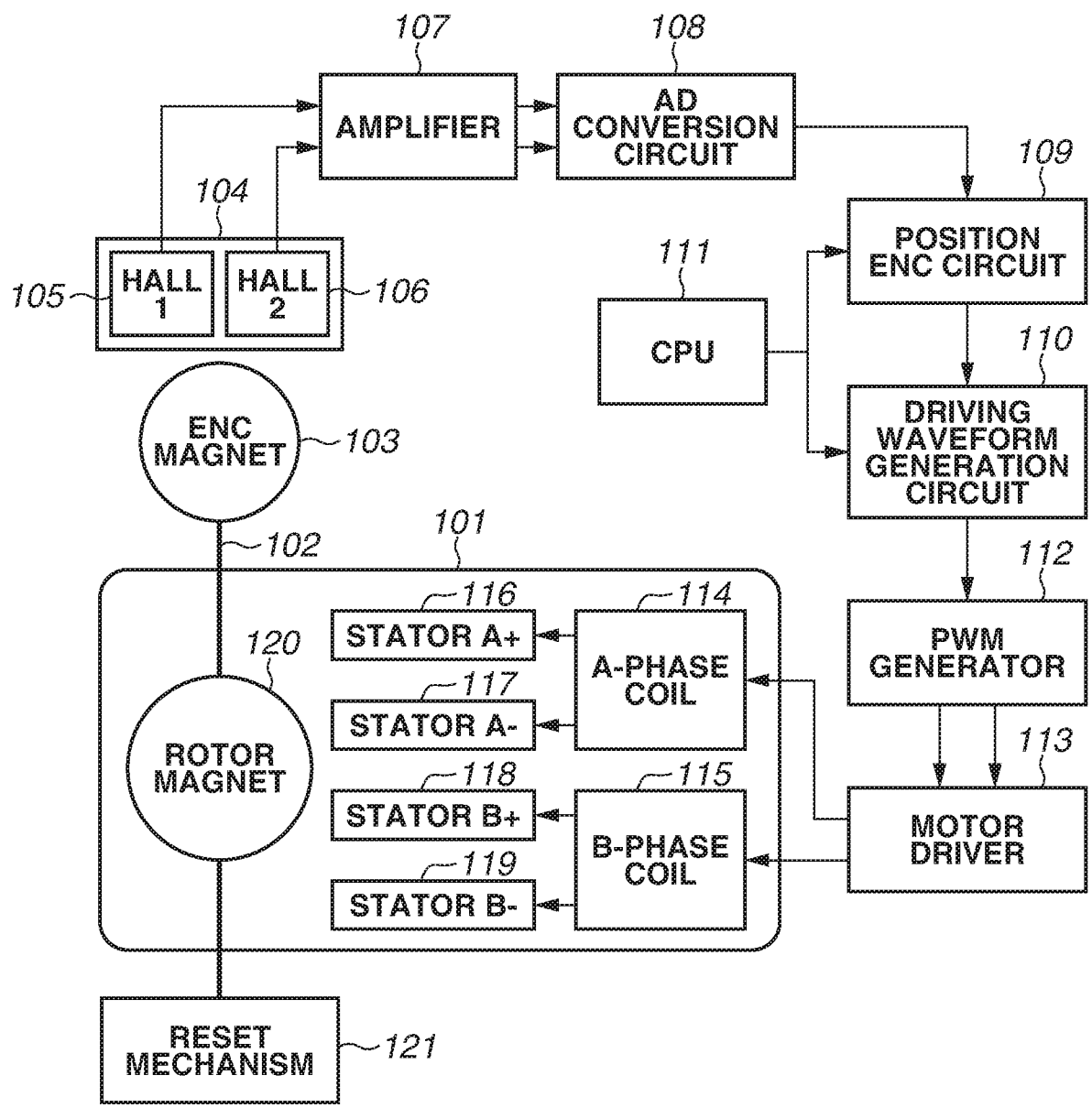
FIG. 1 is a block diagram illustrating an outline of a system according to a first exemplary embodiment.

FIG. 1 is a block diagram illustrating an outline of a motor system according to the first exemplary embodiment, and the diagram illustrates an example configuration of a motor driving apparatus including a driving electric circuit, and a stepping motor 101.

The stepping motor 101 includes an encoding (ENC) magnet 103 on a rotor shaft 102. The ENC magnet 103 is magnetized so that a magnetic field generated on a circumference centered on the rotational axis of the ENC magnet 103 generates a sinusoidal magnetic field according to a rotational position of the ENC magnet 103. The stepping motor 101 further includes a reset mechanism 121. The reset mechanism 121 is configured to output a signal that changes at a particular position according to rotation of the rotor shaft 102. This signal is a signal for giving a reference for an absolute position relative to a rotational position of the motor 101. More specifically, the reset mechanism 121 operates as follows. The rotor shaft 102 is a screw shaft, and a slit is formed in a moving member that makes a translational movement according to the rotation of the screw shaft. Light is blocked in a photointerrupter by the moving member except for the slit, thereby changing an output signal from the photointerrupter.

A Hall element package 104 is a magnetic detection unit for the ENC magnet 103 and includes a plurality of Hall elements. For example, Hall elements 105 and 106, at their respective positions, each detect a change in the magnetic field due to rotation of the ENC magnet 103 and output a detection signal to an amplifier 107. With reference to FIGS. 2A to 2C, a specific example is described.

FIG. 2A is a perspective view illustrating an example of an external appearance of the stepping motor 101. The short cylindrical ENC magnet 103 is installed on the rotor shaft 102 of the stepping motor 101. The Hall element package 104 is placed in a position where the Hall element package 104 can detect the magnetic field generated by the ENC magnet 103. A wiring member 201 is drawn out of the stepping motor 101 and is connected to a motor driver 113 described below.

FIG. 2B is a diagram schematically illustrating positional relationships between the ENC magnet 103 and the Hall elements 105 and 106. The ENC magnet 103 is a magnet having five pole pairs (ten poles) (i.e., areas located every 36 degrees are magnetized). The Hall elements 105 and 106 are placed at an equal distance from the center position of the ENC magnet 103. The Hall elements 105 and 106 are placed so that an angle between the Hall elements 105 and 106 relative to the center position, i.e., a physical angle between the two Hall elements relative to the center position, is 18 degrees. The phase difference between signal phases detected by the two Hall elements is 90 degrees.

The amplifier 107 in FIG. 1 amplifies weak signals input from the Hall elements 105 and 106 and outputs the resulting signals to an analog-to-digital (AD) conversion circuit 108 at a subsequent stage. The AD conversion circuit 108 digitally converts the analog voltage signals input from the amplifier 107, thereby digitizing the analog voltage signals. Then, the AD conversion circuit 108 outputs the conversion results as digital numerical signals to a position ENC circuit 109.

The position ENC circuit 109 performs encoding of the signals input from the AD conversion circuit 108. The position ENC circuit 109 includes a processing unit for adjusting offsets and gains of the two input signals. After the adjustments, the position ENC circuit 109 calculates a tangent (tan) value from the two signals and then performs arctangent (arctan) calculation on the tan value to generate rotational angle information. The position ENC circuit 109 integrates the rotational angle information to generate rotational position information. The generated rotational position information is transmitted to a driving waveform generation circuit 110.

The driving waveform generation circuit 110 generates a driving waveform for the motor 101. The driving waveform generation circuit 110 switches between open driving and close driving. The open driving is driving for outputting, at a frequency set in advance, sine wave signals for driving in different phases. The close driving is driving for outputting a driving waveform linked with the position ENC circuit 109. The open driving and the close driving are switched according to an instruction from a central processing unit (CPU) 111. The CPU 111 instructs the driving waveform generation circuit 110 to switch between the open driving and the close driving and sets the frequency and amplitude gain values of the sine wave signals to be output when the open driving is performed. The CPU 111 makes an initialization setting of a position count value for the position ENC circuit 109. Processing by the position ENC circuit 109 and the driving waveform generation circuit 110 will be described below with reference to FIGS. 3A to 5B.

According to a pulse-width modulation (PWM) instruction value output from the driving waveform generation circuit 110, a PWM generator 112 outputs PWM signals to the motor driver 113. The PWM signals will be described below with reference to FIGS. 5A and 5B.

Figure 3A:
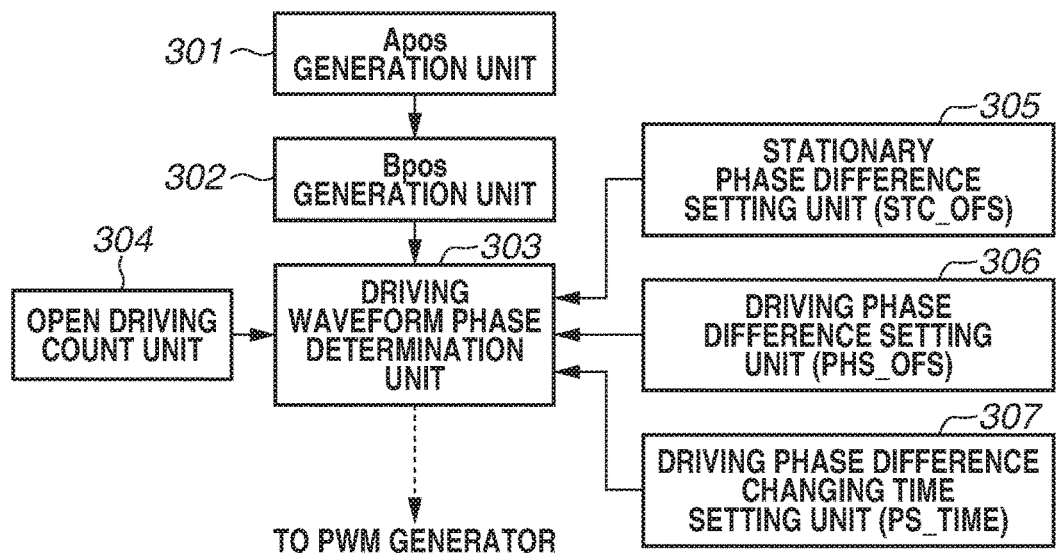
FIGS. 3A, 3B, 3C, 3D, and 3E are diagrams illustrating processing performed by a position encoding (ENC) circuit and a driving waveform generation circuit.

Next, with reference to FIGS. 3A to 3E and 4A to 4C, the processing by the position ENC circuit 109 and the driving waveform generation circuit 110 is described in detail. FIG. 3A is a block diagram illustrating the processing by the position ENC circuit 109 and the driving waveform generation circuit 110 in detail. Units from an Apos generation unit 301 to a Bpos generation unit 302 correspond to the position ENC circuit 109. Units from a driving waveform phase determination unit 303 to a driving phase difference changing time setting unit 307 correspond to the driving waveform generation circuit 110.

An output signal from the Hall element 105 in FIG. 1 is referred to as a detection signal 1, and an output signal from the Hall element 106 is referred to as a detection signal 2. The detection signals 1 and 2 are input to the AD conversion circuit 108 via the amplifier 107. The signals subjected to AD conversion by the AD conversion circuit 108 are acquired by the Apos generation unit 301. Based on the detection signals 1 and 2 subjected to the AD conversion, the Apos generation unit 301 calculates a rotational position using arctan (arctangent) calculation. As preprocessing, the Apos generation unit 301 adjusts offsets and gains of the two input signals. More specifically, the Apos generation unit 301 adjusts the offsets and the gains of the two signals to be equal. These adjustments are made using a result of detecting peak values and bottom values of the two signals by rotating the motor 101 by the open driving. After the adjustments, the Apos generation unit 301 calculates a tangent value based on two sine wave signals having a phase difference of 90 degrees therebetween and performs arctangent calculation on the tangent value, thereby generating rotational angle information (referred to as Apos). The Apos generation unit 301 calculates a value obtained by integrating a value of the rotational angle and thereby can generate rotational position information. With reference to examples of FIGS. 4A, 4B, and 4C, relationships between the detection signals 1 and 2 and the rotational position information are described.

Figure 4A:
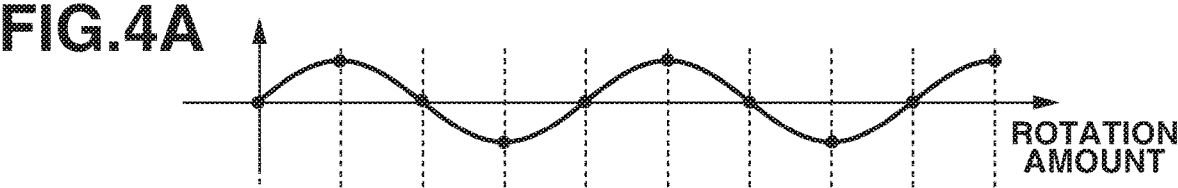
FIGS. 4A, 4B, and 4C are graphs illustrating relationships between position detection signals and a detection position count.
Figure 4B:
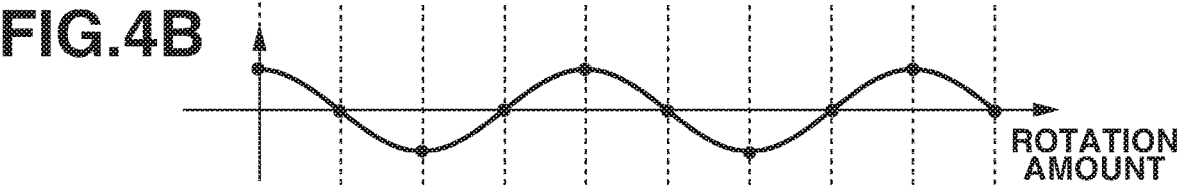
Figure 4C:
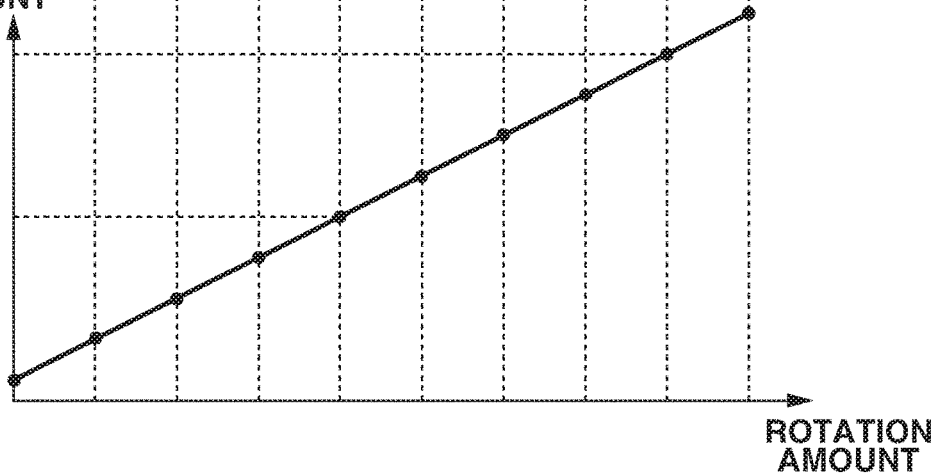

FIGS. 4A and 4B illustrate examples of signals after detected rotational position signals are adjusted. The signal illustrated in FIG. 4A is a sine wave signal, and the signal illustrated in FIG. 4B is a cosine wave signal. FIG. 4C illustrates a change in the count value at a detection position. The horizontal axis represents a rotation amount of the rotor. In the present exemplary embodiment, when signals from the two Hall elements are output for one wavelength of the sine wave, a position can be detected with a position resolution corresponding to 1024 counts. The count value of the detection position is stored in a storage area of the Apos generation unit 301 in FIG. 3A.

Figure 3B:
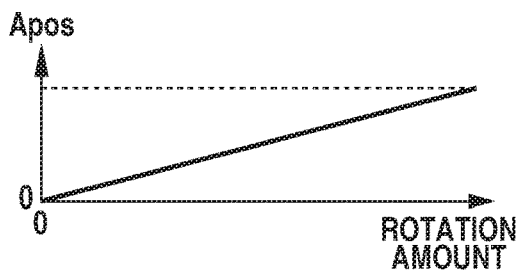

FIG. 3B illustrates Apos, and the horizontal axis of the graph represents a rotation amount of the rotor. A value of Apos is a count value proportional to the rotation amount of the rotor. Then, a Bpos generation unit 302 takes over the processing of the Apos generation unit 301.

Figure 3C:
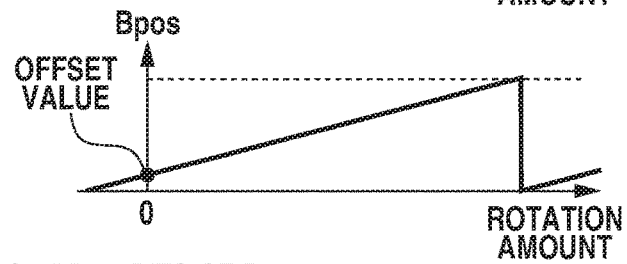

The Bpos generation unit 302 generates information (referred to as Bpos) having an arbitrary offset value relative to Apos. The CPU 111 can rewrite Bpos with any value at any timing. The CPU 111 records the value rewritten at this timing and an amount of difference between Bpos and Apos as the offset value. FIG. 3C illustrates Bpos, and the horizontal axis represents the rotation amount of the rotor. The Bpos generation unit 302 generates a Bpos value, which is obtained by adding the recorded offset value to the Apos value illustrated in FIG. 3B. The Bpos value is a sawtooth wave signal value that periodically changes between zero and an upper limit relative to the rotation amount.

The information of Bpos generated by the Bpos generation unit 302 is input to the driving waveform phase determination unit 303. The driving waveform phase determination unit 303 determines phase count information of a driving waveform to be applied to an A-phase coil 114 and a B-phase coil 115. The driving waveform phase determination unit 303 outputs a PWM value corresponding to the phase count to the PWM generator 112 in FIG. 1. The driving waveform phase determination unit 303 can switch between open driving for outputting the phase count information according to an instruction from the open driving count unit 304 and position linkage driving (close driving) for outputting phase count information based on the Bpos value. In the position linkage driving, based on the information of Bpos output from the position ENC circuit 109, the driving waveform phase determination unit 303 of the driving waveform generation circuit 110 determines phase count information. Thus, a phase of the rotational position detected by the position ENC circuit 109 and a phase of the driving waveform generated by the driving waveform generation circuit 110 are synchronized with each other. This synchronization process is performed by the position ENC circuit 109 and the driving waveform generation circuit 110. The open driving and the position linkage driving are switched by the CPU 111 making a setting of the driving waveform phase determination unit 303.

To perform the open driving, the CPU 111 specifies the frequency of the driving waveform to the open driving count unit 304 and sets the amplitude gain of the driving waveform in the driving waveform phase determination unit 303. Consequently, the driving waveform phase determination unit 303 outputs a driving waveform having a desired frequency and a desired amplitude. Meanwhile, to perform the position linkage driving, the driving waveform phase determination unit 303 calculates a value obtained by adding predetermined offset values to the lower 10 bit values of Bpos. The predetermined offset values are as follows.

A first offset value (an STC_OFS value) set through a stationary phase difference setting unit 305 by the CPU 111

A second offset value (a PHS_OFS value) set through a driving phase difference setting unit 306 by the CPU 111

Figure 3D:
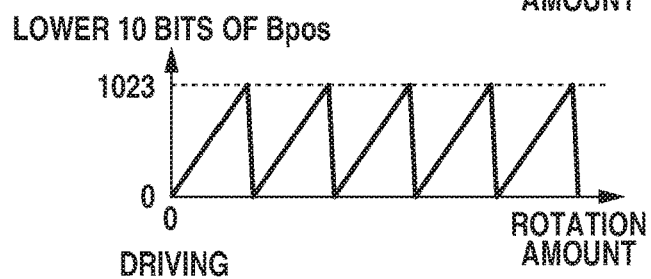
Figure 3E:
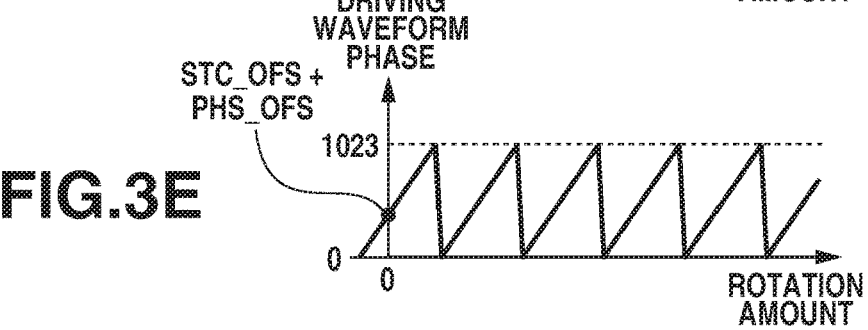

A value obtained by adding these offsets is calculated, thereby acquiring the count value of the driving waveform phase. An output value of a phase corresponding to this count value is selected as an output value of the driving waveform. FIGS. 3D and 3E illustrate this relationship in graphs. FIG. 3D illustrates the relationship between the lower 10 bit values of Bpos and the rotation amount. FIG. 3E illustrates a driving waveform after the offsets are added. The horizontal axis represents the rotation amount of the rotor. The offset values are added by adding both STC_OFS and PHS_OFS to Bpos. As described below, STC_OFS has a function of managing stable positions of a detection position count of the rotor and a driving waveform count. PHS_OFS is assigned with a function of managing a phase difference for generating a torque.

If a setting value of the driving phase difference setting unit 306 is changed, the driving waveform phase determination unit 303 does not instantaneously switch from the phase difference before the change (i.e., the current phase difference) to the phase difference after the change, but changes the phase difference over a set time. Herein, this function is referred to as a phase difference gradual increase/decrease change function. Even if the set phase difference is changed, this function slows down an actual change in the driving waveform to be applied to the motor driver 113. Thus, the driving waveform can hold a smooth waveform, and vibration and noise can be reduced. This function can be set to on and off by the CPU 111. The time required for a phase difference change from the phase difference before the change to the phase difference after the change, in other words, the time required for the phase difference to reach the phase difference after the change is referred to as a changing time of the phase difference. According to the phase difference before the change, the phase difference after the change, and the changing time, the driving waveform phase determination unit 303 determines the phase of the driving waveform, thereby achieving the phase difference gradual increase/decrease change function.

The changing time of the phase difference in the phase difference gradual increase/decrease change function is set by the driving phase difference changing time setting unit 307 in FIG. 3A. A value corresponding to the changing time of the phase difference and set in the driving phase difference changing time setting unit 307 by the CPU 111 is referred to as PS_TIME, and the changing time can be set to this value in accuracy of a millisecond (ms) unit.

Figure 5A:
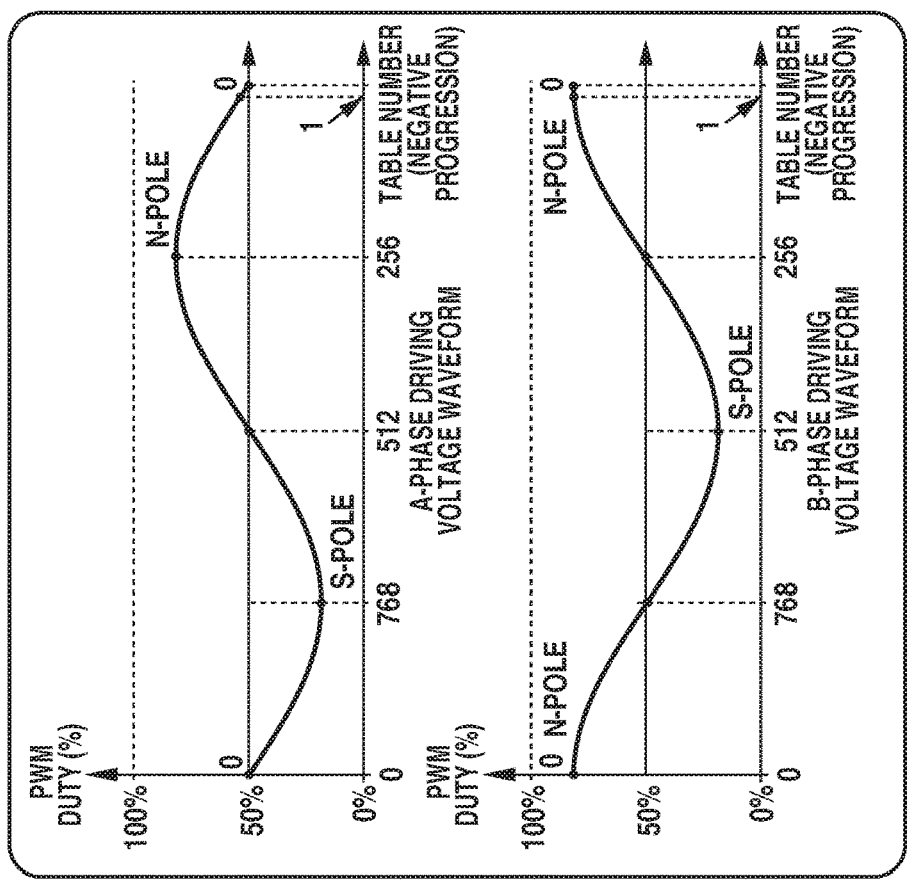
FIGS. 5A and 5B are graphs each illustrating a relationship between a driving waveform and a phase count of a motor.
Figure 5B:
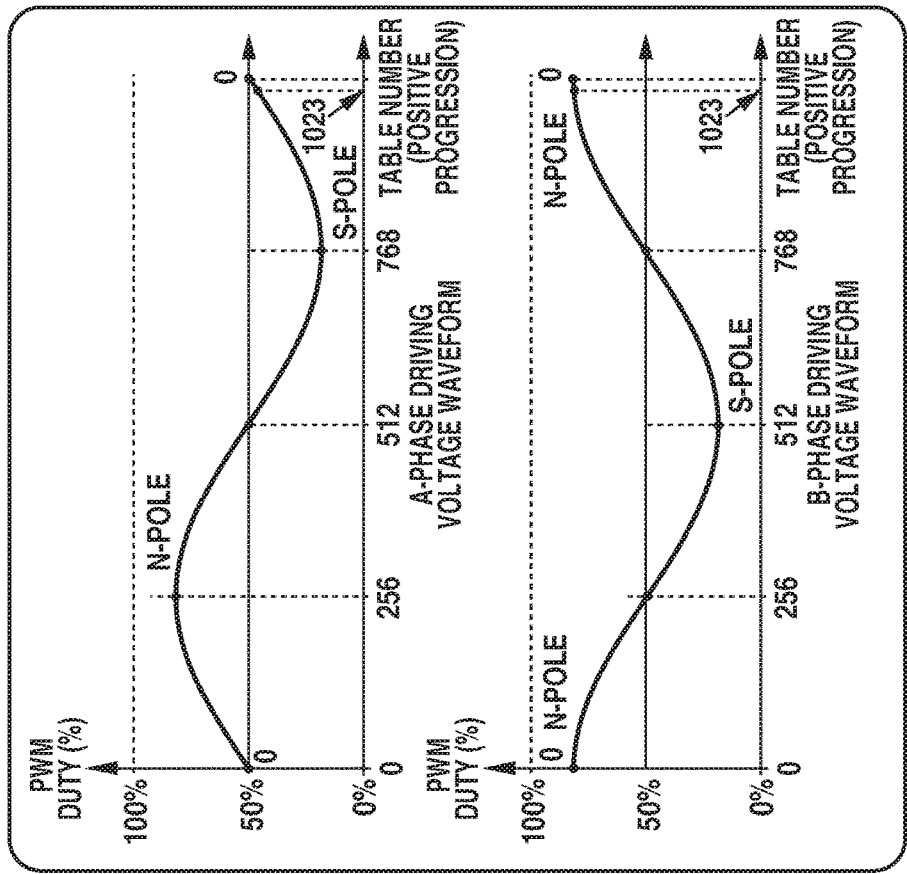

According to a PWM instruction value output from the driving waveform generation circuit 110, the PWM generator 112 outputs PWM signals to the motor driver 113. With reference to FIGS. 5A and 5B, a relationship between a sine wave position count value and a PWM value (duty % value) to be output is described. In each of FIGS. 5A and 5B, the horizontal axes represent a table number and are based on a resolution of 1024 similarly to the output value illustrated in FIG. 3E. The vertical axes represent a duty % value of the PWM signal.

In FIG. 5A, the horizontal axes are counted positively, and a B-phase driving voltage waveform precedes an A-phase driving voltage waveform by 90 degrees. This illustrates a case where the motor 101 rotates in a clockwise (CW) direction. Conversely, in FIG. 5B, the horizontal axes are counted negatively, and the A-phase driving voltage waveform precedes the B-phase driving voltage waveform by 90 degrees. This illustrates a case where the motor 101 rotates in a counterclockwise (CCW) direction. The duty % value of each of the vertical axes increases or decreases according to a gain setting value set by the CPU 111. In the present exemplary embodiment, an appropriate gain value that does not affect the rotational motion of the motor 101 is set.

Figure 6:
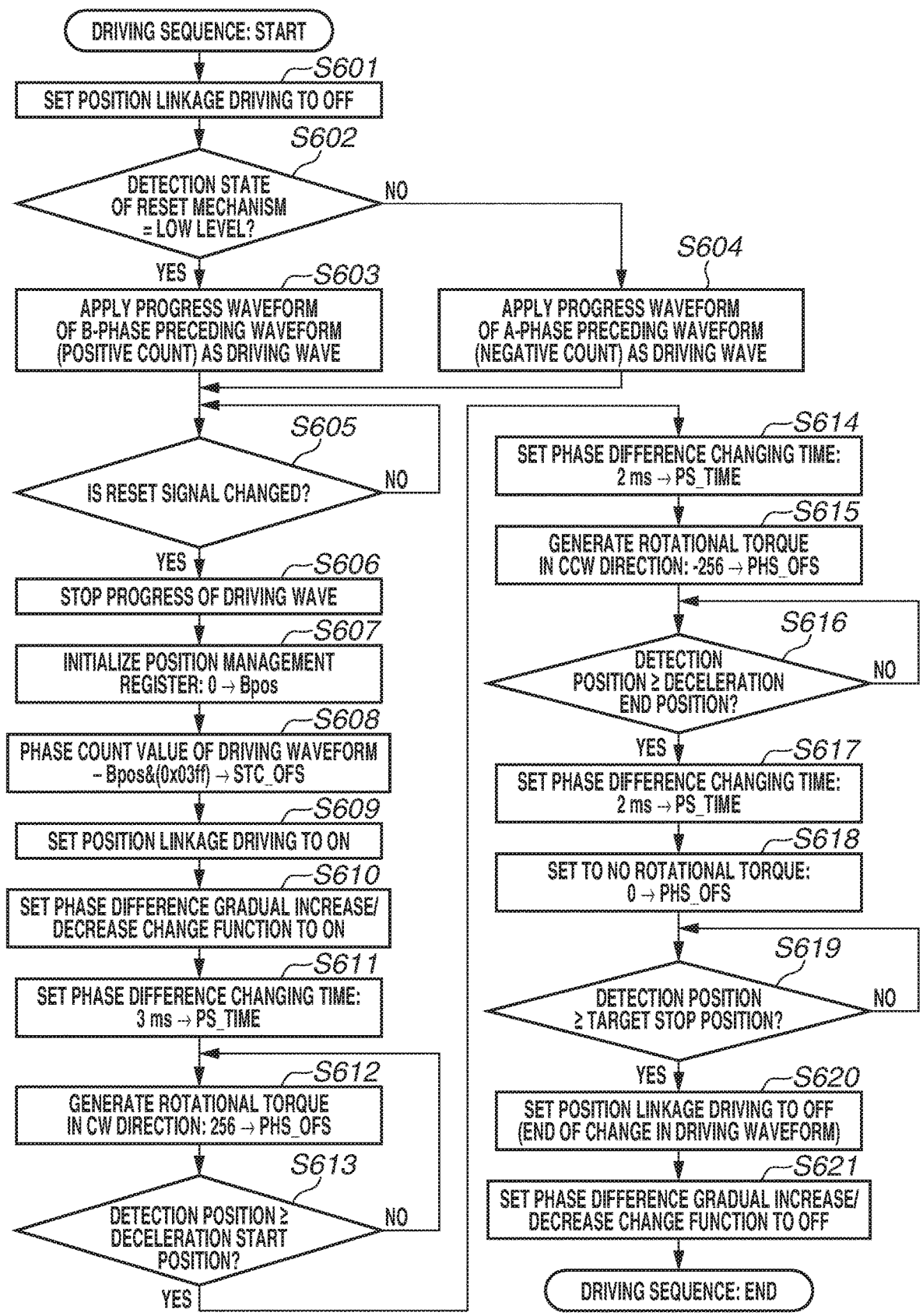
FIG. 6 is a flowchart illustrating processing according to the first exemplary embodiment.

FIG. 6 is a flowchart illustrating a flow of the processing according to the present exemplary embodiment. According to a predetermined program, the CPU 111 performs control described below and illustrated in FIG. 6.

If a driving sequence starts, the processing proceeds to step S601. In step S601, first, the CPU 111 sets the position linkage driving to off so that the open driving operates. In step S602, the CPU 111 determines a detection state of a reset signal output from the reset mechanism 121. The reset signal is a binary signal that, according to a movement of a detection target member attached to a screw mechanism of the rotor shaft 102, changes to a high level or a low level when the detection target member passes through a position set in advance. The high level is output as the reset signal on a side where the detection target member moves when the motor driving apparatus applies a B-phase preceding driving waveform to the stepping motor 101 so as to rotate the stepping motor 101 in the CW direction. The low level is output as the reset signal on a side where the detection target member moves when the motor driving apparatus applies an A-phase preceding driving waveform to the stepping motor 101 so as to rotate the stepping motor 101 in the CCW direction. To detect the position where the reset signal changes and to finalize an absolute position, the determination process in step S602 is performed.

If the reset signal is at the low level in step S602 (YES in step S602), the processing proceeds to step S603. If the reset signal is at the high level in step S602 (NO in step S602), the processing proceeds to step S604. In step S603, the CPU 111 instructs the open driving count unit 304 (FIG. 3A) to generate a driving wave having a B-phase preceding waveform, thereby controlling the motor 101 to rotate. In step S604, the CPU 111 instructs the open driving count unit 304 to generate a driving wave having an A-phase preceding waveform, thereby controlling the motor 101 to rotate. After the process of step S603 or S604, the processing proceeds to step S605.

In step S605, the CPU 111 determines whether the state of the reset signal is changed. The CPU 111 monitors the reset signal, and if the reset signal is changed (YES in step S605), the processing proceeds to step S606. If the reset signal is not changed (NO in step S605), the CPU 111 continues monitoring of the reset signal and repeats the determination process in step S605. In step S606, the CPU 111 outputs an instruction to stop progress of the driving waveform to the open driving count unit 304. A position where the progress stops at this time serves as a reference position for a position count. In step S607, the CPU 111 initializes a Bpos value for making a final position management of a detection position and performs the process of writing zero to Bpos.

In step S608, the CPU 111 executes the process of writing, to STC_OFS, a value obtained by subtracting the lower 10 bit values of Bpos from the phase count value of the driving waveform held in the driving waveform phase determination unit 303 in a state where the rotor is at a stop. The value of STC_OFS is a value for preventing the output phase of the driving waveform from shifting at a moment when the position linkage driving is set to on. At the time of step S608, as a result of the open driving waveform, the rotor magnet 120 is at a stable stop in a state where a certain driving waveform phase is output. After the position linkage driving is set to on, a driving waveform phase is generated based on the lower 10 bit values of Bpos. Immediately after the position linkage driving is set to on, the value of STC_OFS is added to the lower 10 bit values of Bpos. A value obtained by the addition is output as the phase count value of the driving waveform. Thus, it is guaranteed that the phase count value of the driving waveform does not change before and after the position linkage driving is set to on or off. Next, the processing proceeds to step S609.

In step S609, the CPU 111 sets the position linkage driving to on. At this time, the offset PHS_OFS is set to zero. Immediately after the position linkage driving is set to on, as described above, the output phase of the driving waveform does not change.

In step S610, the CPU 111 sets the phase difference gradual increase/decrease change function to on.

In step S611, the CPU 111 sets PS_TIME to 3 ms. This numerical value of 3 ms is a numerical value set so that, in behavior of the motor 101 at the start of the motion described below, a vibration behavior and a noise generation behavior of the motor 101 fall within acceptable ranges. The numerical value can be appropriately determined according to the configuration of the motor 101 to be driven and the acceptable ranges of vibration and noise. The numerical value can be determined by performing experimental checking or determined by simulation.

In step S612, the CPU 111 performs an operation of generating a rotational torque in the CW direction (forward torque) using a linkage function. More specifically, PHS_OFS is set to 256, which is a value corresponding to 90 degrees in the driving waveform phase. A phenomenon that occurs in the motor 101 at this time will be described below with reference to FIGS. 7A to 10H.

In step S613, the CPU 111 performs a determination process for determining a deceleration start position of the motor 101. If it is determined that the detection position of the rotor is equal to or further than the deceleration start position (YES in step S613), the processing proceeds to step S614. If it is determined that the detection position of the rotor is closer than the deceleration start position (NO in step S613), the determination process in step S613 is repeated. The deceleration start position is set as follows. Driving characteristics of the motor 101 and a mechanism portion are checked in advance, and the deceleration start position is set to a position short of a target stop position by a required rotation amount so that a sufficient deceleration effect is obtained when a desired deceleration torque is applied.

In step S614, the CPU 111 sets PS_TIME to 2 ms. Similarly to the case of the behavior of the motor 101 at the start of the motion, this numerical value of 2 ms is a numerical value set so that the vibration behavior and the noise generation behavior fall within acceptable ranges when the deceleration starts.

In step S615, the CPU 111 sets PHS_OFS to a value of −256 so that a rotational torque in the CCW direction (revere torque), i.e., a brake torque against the rotation of the motor 101 in the CW direction, is applied to the motor 101. From this timing, the phase difference between the detection position and the driving waveform is changed to −256 over a time of 2 ms, which is set as PS_TIME in step S614, and the detection position and the driving waveform shift to a phase relationship in which the brake torque is applied.

In step S616, the CPU 111 determines whether the detection position of the rotor is equal to or further than a deceleration end position. If the detection position of the rotor is equal to or further than the deceleration end position (YES in step S616), the processing proceeds to step S617. If the detection position of the rotor is closer than the deceleration end position (NO in step S616), the determination process in step S616 is repeated. The deceleration end position is set as follows. The driving characteristics of the motor 101 and the mechanism portion are checked in advance, and the deceleration end position is set to a position short of the target stop position so that the motor 101 can be sufficiently decelerated and can reach the target stop position using inertia after the deceleration ends.

In step S617, the CPU 111 sets PS_TIME to 2 ms. Similarly to the cases of the behavior of the motor 101 at the start of the motion and the behavior of the motor 101 at the start of the deceleration, this numerical value of 2 ms is a numerical value set so that the vibration behavior and the noise generation behavior fall within acceptable ranges when the deceleration ends. In step S618, the CPU 111 sets the value of PHS_OFS to 0. If PHS_OFS is set to 0, PHS_OFS changes from 0 to −256, i.e., the phase relationship between the detection position and the driving waveform shifts from the phase relationship in which the brake torque is applied to a phase relationship in which a rotational torque is not generated, over 2 ms from the set timing.

In step S619, the CPU 111 determines whether the detection position of the rotor is equal to or further than the target stop position set in advance. If the detection position of the rotor is equal to or further than the target stop position (YES in step S619), the processing proceeds to step S620. If the detection position of the rotor is closer than the target stop position (NO in step S619), the determination process in step S619 is repeated. In step S620, the CPU 111 sets the position linkage driving to off and fixes the phase of the driving waveform. Consequently, the motor 101 stops rotating. Finally, in step S621, the CPU 111 sets the phase difference gradual increase/decrease change function to off, and the series of processes ends.

With reference to FIGS. 7A to 7D to FIGS. 10A to 10H, the process of step S612 in FIG. 6 is specifically described. FIG. 7A is a schematic diagram regarding placement of a group of stators illustrated in FIG. 2C and illustrating a state where the stators are arranged side by side. FIG. 7B is a graph schematically illustrating how a voltage is applied to the group of stators in a circumferential direction of the motor 101. FIG. 7C is a graph illustrating strength of a magnetic field that is generated by the group of stators by applying the voltage and corresponding to positions in the circumferential direction. FIG. 7D is a graph illustrating a magnetization phase of the rotor magnet 120 illustrated in FIG. 2C. FIGS. 7A to 7D illustrate the state of step S611 in FIG. 6. In this state, a relationship between a north-south (NS) magnetic pole phase of the magnetic field generated by the group of stators and a NS magnetic pole phase of the rotor magnet 120 is a relationship in which the rotor is at a stable stop (the state where PHS_OFS is set to 0). Meanwhile, after PHS_OFS is set to 256 in step S612, the relationship between FIGS. 7C and 7D changes to the relationship between FIGS. 8C and 8D over the time (3 ms) set to PS_TIME.

FIGS. 8A, 8B, 8C, and 8D are diagrams illustrating a state after the value of PHS_OFS is set to 256 in step S611 in FIG. 6. FIGS. 8A to 8D correspond to FIGS. 7A to 7D, respectively. In the state of FIGS. 8A, 8B, 8C, and 8D, the magnetic field generated by the group of stators is at a position advanced by 90 degrees as compared with that in FIGS. 7A, 7B, 7C, and 7D. As illustrated in FIG. 8D, this generates an attraction force to pull the rotor magnet 120 to the right, i.e., a rotational torque in the CW direction (forward torque), in the rotor magnet 120.

FIGS. 9A to 9G are graphs illustrating the behavior of the motor 101. FIG. 9A illustrates the temporal change in Bpos. The horizontal axis represents a time axis, and the vertical axis represents the position of the rotor. FIG. 9B is a graph illustrating the temporal change in the value set as PHS_OFS in the driving phase difference setting unit 306. FIG. 9C is a graph illustrating the temporal change in the phase difference between the detected rotational position (hereinafter, referred to as the detection rotational position) and the driving waveform to be actually reflected on the system (i.e., the phase difference between the detection position and the driving waveform based on the PWM instruction value output from the driving waveform generation circuit 110). FIG. 9D is a graph illustrating the temporal change in the lower 10 bit values of Bpos. FIG. 9E is a graph illustrating the temporal change in the phase count value of the driving waveform, which is a value obtained by adding the value in FIG. 9C to the value in FIG. 9D and normalized as a value of 0 to 1023. FIGS. 9F and 9G illustrate the temporal change in a driving waveform magnetic field generated in a stator A+ 116 based on the phase count value of the driving waveform and the temporal change in a driving waveform magnetic field generated in a stator B+ 118 based on the phase count value of the driving waveform, respectively. A time t1 indicates the timing when the value of PHS_OFS is set to 256 in step S611 in FIG. 6. A time t2 indicates the timing when 3 ms elapses from the time t1.

As described in FIGS. 7A to 7D and 8A to 8D, if PHS_OFS is set to 256 at the time t1 in FIGS. 9A to 9G, then as illustrated in FIG. 9C, the phase difference between the detection position and the driving waveform to be actually reflected on the system changes from 0 to 256 over 3 ms. Consequently, the phase count value of the driving waveform gradually increases from the time t1 to the time t2. This suppresses generation of vibration and noise due to rapid torque fluctuations.

If a change in the phase difference between the detection position and the driving waveform due to a change in the setting of PHS_OFS is immediately reflected, a value obtained by adding the value in FIG. 9B to the value in FIG. 9D is normalized as a value of 0 to 1023, thereby obtaining the state of FIG. 9E. In this case, at the time t1, the count value of the driving waveform instantaneously jumps, whereby continuity of the driving waveform is impaired, which causes vibration and noise.

From the time t1 to the time t2, the rotational torque gradually increases. From the time t2 onward, the motor 101 rotates by the torque according to the set phase difference. The motor 101 rotates, whereby Bpos corresponding to the detection position progresses. Consequently, the phase count value of the driving waveform also progresses. By this loop process, the phase difference between the two waveforms illustrated in FIGS. 8C and 8D is maintained, and the rotational torque continues to be applied. As a result, as illustrated in FIG. 9A, the motor 101 is accelerated, and the rotational speed of the motor 101 increases.

FIGS. 10A to 10H are graphs illustrating the behavior of the motor 101 illustrated in FIGS. 9A to 9G after the motor 101 is accelerated. FIGS. 10A to 10H illustrate the state where the motor 101 is accelerated, enters a constant speed state in which the motor 101 is driven at a uniform rate, is decelerated, idly runs, and stops at the target stop position (TP in FIG. 10A). FIG. 10A illustrates the temporal change in Bpos. The horizontal axis is a time axis, and the vertical axis represents the position. FIG. 10B illustrates the temporal change in the number of rotations (speed) of the motor 101. The horizontal axis represents a time axis, and the vertical axis represents the rotational speed. FIG. 10C is a graph illustrating the temporal change in the value set as PHS_OFS in the driving phase difference setting unit 306. FIG. 10D is a graph illustrating the temporal change in the phase difference between the detection rotational position and the driving waveform to be actually reflected on the system (phase difference between the detection position and the driving waveform based on the PWM instruction value output from the driving waveform generation circuit 110). FIG. 10E is a graph illustrating the temporal change in the lower 10 bit values of Bpos. FIG. 10F is a graph illustrating the temporal change in the phase count value of the driving waveform. The phase count value of the driving waveform corresponds to a value obtained by adding an instruction phase difference to the value illustrated in FIG. 10E and normalized as a value of 0 to 1023.

FIGS. 10G and 10H illustrate the temporal change in the driving waveform magnetic field generated in the stator A+ 116 based on the phase count value of the driving waveform and the temporal change in the driving waveform magnetic field generated in the stator B+ 118 based on the phase count value of the driving waveform, respectively. In FIGS. 10A to 10H, until a time t3, the motor 101 continues to be accelerated. In the period from the time t3 to a time t4, the motor 101 is in a constant speed state. This is because, as the number of rotations increases, a generated torque attenuates due to a frequency response delay of a coil when a voltage is converted into a current or because, as an influence of a counter-electromotive force increases, the generated torque, the counter-electromotive force, and a mechanical load become a balanced state at a certain number of rotations.

If it is determined in step S613 in FIG. 6 that the detection position is equal to or further than the deceleration start position, then through the process of step S614, the processing proceeds to step S617. In step S617, a deceleration control is performed. The time t4 in FIGS. 10A to 10H corresponds to the timing of step S615. After PHS_OFS is set to −256 in step S615, the relationship between FIGS. 8C and 8D changes to the relationship between FIGS. 11C and 11D over a time of 2 ms set to PS_TIME. FIGS. 11A to 11D are diagrams illustrating the state in step S615. FIGS. 11A to 11D correspond to FIGS. 8A to 8D, respectively. The magnetic field generated by the group of stators, however, is at a position delayed by 90 degrees as compared with that in FIGS. 7A, 7B, 7C, and 7D. As illustrated in FIG. 11D, this generates an attraction force to pull the rotor magnet 120 to the left, i.e., a rotational torque in the CCW direction (deceleration torque), in the rotor magnet 120. This torque acts as a brake torque against the rotational torque in the CW direction in step S615. Thus, a quick deceleration operation is performed using this brake torque.

As illustrated in FIG. 10D, if PHS_OFS is set to −256 at the time t4, the phase difference between the detection position and the driving waveform to be actually reflected on the system changes from 256 to −256 over 2 ms from the time t4 to a time t5. It is evident from FIGS. 10E and 10F that from the time t4 to the time t5, the count value of the driving waveform changes more slowly than the change in the detection rotational position, and from the time t5, the count value of the driving waveform and the detection rotational position converge to a phase relationship in which the count value of the driving waveform maintains the count value of −256 relative to the detection rotational position. Since the count value of the driving waveform slowly changes in this way, it is possible to reduce the generation of vibration and noise due to rapid torque fluctuations.

A time t6 in FIGS. 10A to 10H corresponds to the processing timing of step S618. If PHS_OFS is set to 0 at the time t6 in FIGS. 10A to 10H, then as illustrated in FIG. 10D, the phase difference between the detection position and the driving waveform to be actually reflected on the system changes from −256 to 0 over 2 ms from the time t6 to a time t7. It is evident from FIGS. 10E and 10F that from the time t6 to the time t7, the count value of the driving waveform and the lower 10 bit values of Bpos converge to a state where the count value of the driving waveform is not different from the lower 10 bit values of Bpos. This suppresses the generation of vibration and noise due to rapid torque fluctuations. A time t8 in FIGS. 10A to 10H corresponds to the processing timing of step S620. At the time t8, as illustrated in step S620, the linkage function is set to off, and the motor 101 stops rotating.

In the second exemplary embodiment, a description is given of a configuration and processing for performing a tracking control to obtain a target speed based on a value set as PHS_OFS in the driving phase difference setting unit 306.

Figure 12:
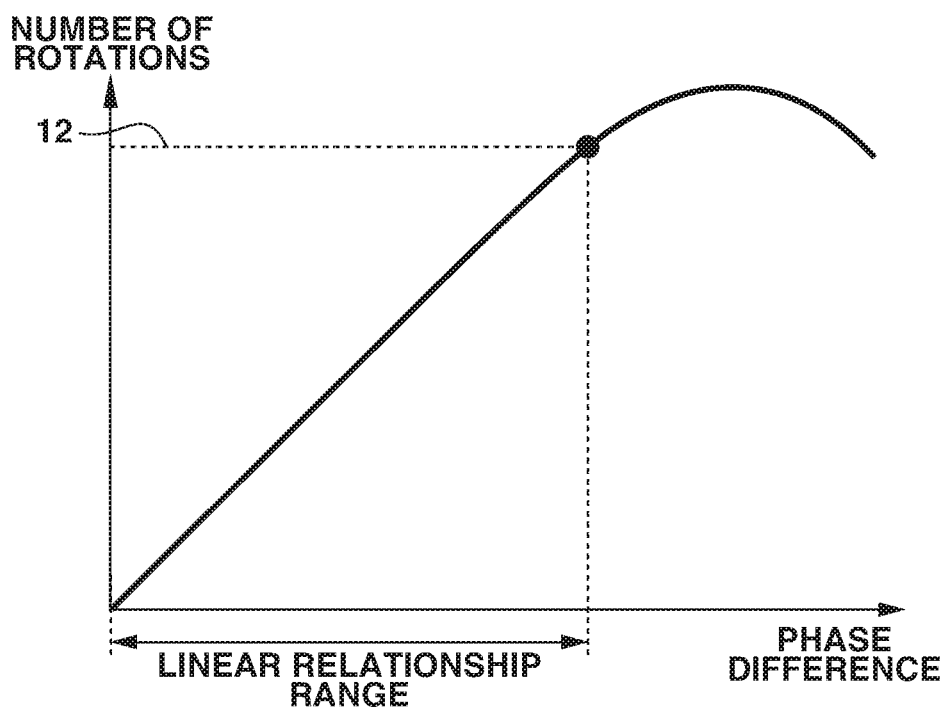
FIG. 12 is a diagram illustrating a relationship between a phase difference between a rotor magnet phase and a driving waveform phase and the number of rotations at a stationary speed.

FIG. 12 is a diagram illustrating the relationship between the phase difference between a detection position count and a driving waveform, which is set as PHS_OFS, and the stationary rotational speed of the motor 101. This relationship has the following characteristics. If the setting value of the phase difference represented by the horizontal axis is increased, the number of rotations increases steadily, reaches an upper limit at a certain point, and then decreases. In a range where the phase difference and the number of rotations are regarded as having a linear relationship as in a linear relationship range 12 indicated with a dotted line, a general speed control can be performed using the setting value of the phase difference as a control amount. The specific configuration and processing of the present exemplary embodiment are described below.

A motor driving apparatus according to the present exemplary embodiment is different from the motor driving apparatus according to the first exemplary embodiment in that the motor driving apparatus according to the present exemplary embodiment further includes a number-of-rotations acquisition unit for acquiring the number of rotations of the motor 101, and a target number-of-rotations setting unit for setting a target number of rotations corresponding to a target speed. The specific configuration of the number-of-rotations acquisition unit does not particularly matter as long as the number-of-rotations acquisition unit can acquire the number of rotations of the motor 101. For example, based on a signal indicating the rotational position output from the position ENC circuit 109, the number of rotations is calculated by differentiating the rotational position or performing filter calculation. Thus, it is possible to acquire the number of rotations without separately providing a sensor.

Figure 13:
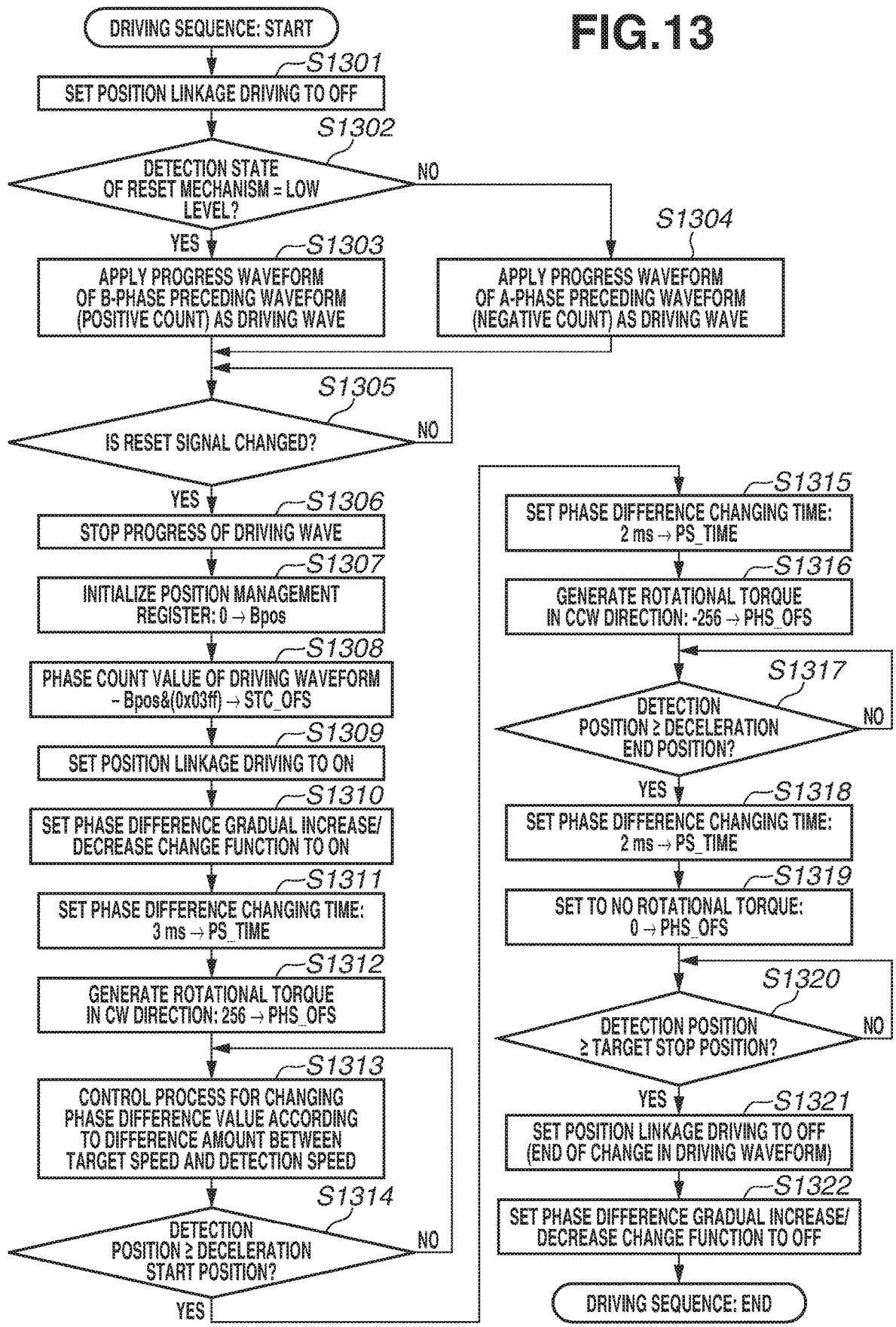
FIG. 13 is a flowchart illustrating processing according to the second exemplary embodiment.

With reference to a flowchart in FIG. 13, the processing performed in the present exemplary embodiment is described.

Steps S1301 to S1312 are similar to steps S601 to S612 in FIG. 6, which are described in the first exemplary embodiment, and therefore are not described here. In step S1312, the CPU 111 sets the phase difference to 256, whereby an acceleration torque is applied, and a rotational motion is started. Then, the processing proceeds to step S1313.

In step S1313, the CPU 111 acquires an actual speed value (also referred to as a detection speed value) and calculates a difference in speed between the detection speed value and a target speed set in advance. The acquisition method for acquiring the detection speed value can be any method. For example, a method for performing a differentiation process on the count value of the detection position can be used. A controller directed to performing tracking to obtain a target speed is designed in advance using this difference in speed as a deviation amount. Then, the controller calculates a phase difference control amount based on the deviation amount, thereby performing a speed tracking process. This controller may be a general proportional-integral-derivative (PID) controller or a controller using a phase compensation filter. Alternatively, an advanced controller outside of the classical control theory may also be used.

In step S1314, the CPU 111 performs a determination process for determining a deceleration start position of the motor 101. If it is determined that the detection position of the rotor is equal to or further than the deceleration start position (YES in step S1314), the processing proceeds to step S1315. If it is determined that the detection position of the rotor is closer than the deceleration start position (NO in step S1314), the processing returns to step S1313. In step S1313, the CPU 111 continues the speed control process.

The processes of steps S1315 to S1322 are similar to the processes of steps S614 to S621 in the flowchart in FIG. 6, which are described in the first exemplary embodiment, and therefore are not described here.

The configuration and processing of each of the above exemplary embodiments are carried out, whereby it is possible to achieve a motor driving apparatus capable of generating a driving waveform with little delay in response in the process of generating a driving waveform having continuity and being efficient for a motor based on a detection rotational position obtained from a rotational position detection mechanism.

A position detector according to each of the above exemplary embodiments has a configuration in which a plurality of Hall sensors and a rotating magnet are used. Alternatively, the position detector can be implemented using another sensor mechanism as long as the position detector is configured to be capable of detecting a rotational position with high accuracy.

In the above exemplary embodiments, the descriptions have been given premised on the configuration of a general claw-pole type stepping motor having ten poles. The aspect of the embodiments, however, is not limited thereto and can also be carried out in a motor having another configuration as long as a permanent magnet is provided on a rotor side and a coil and a stator are provided on a stator side.

In the above exemplary embodiments, if the setting value of the phase difference between the phase of the detection rotational position and the driving waveform phase is changed, the phase difference between the phase of the detection rotational position and the driving waveform phase (FIGS. 9C and 10D) changes according to a linear function from the value before the change to the value after the change. The change in the phase difference between the phase of the detection rotational position and the driving waveform phase, however, is not limited thereto. Alternatively, the phase difference therebetween may also change according to another function such as a sinusoidal function.

In the above exemplary embodiments, the changing time of an instruction value of the phase relationship between the phase of the detection rotational position and the driving waveform phase is directly set. Alternatively, the configuration may be such that an update time of the output value of the driving waveform is determined in a constant cycle, and the changing time is specified based on the number of times of the update cycle. Yet alternatively, the configuration may be such that the output value of the driving waveform is updated in each detection update cycle of the detection rotational position or the output value of the driving waveform is updated at a frequency-division timing of the detection update cycle of the detection rotational position.

In the present exemplary embodiment, the changing time (PS_TIME) of the phase difference is set, and then the phase difference (PHS_OFS) to be set in the driving phase difference setting unit 306 is changed. Alternatively, the phase difference to be set may be changed, and then the changing time of the phase difference may be set. In this case, however, the driving waveform phase determination unit 303 sets the changing time of the phase difference and then changes the phase difference to be output. In the present exemplary embodiment, an actual change in the phase difference is started immediately after the phase difference (PHS_OFS) is set. If the timing is off, however, the actual phase difference is controlled so that the time from when a change in the phase difference is started to when the phase difference reaches the phase difference after the change matches the changing time.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2017-206380, filed Oct. 25, 2017, which is hereby incorporated by reference herein in its entirety.

What is claimed is:

1. A motor driving apparatus comprising:
   at least one processor or circuit programmed to function as:
   a rotation position detection unit configured to detect a rotational position of a rotor;

a phase difference setting unit configured to set a first phase difference between the rotational position and a driving waveform;

a changing time setting unit configured to set a changing time, which is a time required for changing the first phase difference from a first phase difference before the change to a first phase difference after the change, in a case where the set first phase difference is changed;

a determination unit configured to determine a second phase difference between the rotational position and the driving waveform based on the first phase difference before the change, the first phase difference after the change, and the changing time;

a generation unit configured to generate the driving waveform for the rotor based on the detected rotational position and the second phase difference; an acquisition unit configured to calculate a number of rotations of the rotor; and a rotations setting unit configured to set a target number of rotations, wherein the setting unit sets the first phase difference based on a deviation between the acquired number of rotations and the target number of rotations.

2. The apparatus according to claim 1, wherein the determination unit determines the second phase difference according to a timing when the rotation position detection unit detects the rotational position.

3. The apparatus according to claim 1, wherein the determination unit determines the second phase difference so that the second phase difference between the rotational position and the driving waveform changes according to a function from when the first phase difference is changed to when the changing time elapses.

4. The apparatus according to claim 3, wherein the function is a linear function.

5. The apparatus according to claim 3, wherein the function is a sinusoidal function.

6. The apparatus according to claim 1, wherein the rotation position detection unit includes
a first calculation unit configured to calculate a first count value proportional to a rotation amount of the rotor, and
a second calculation unit configured to calculate a second count value that periodically changes relative to the rotation amount.

7. The apparatus according to claim 1, wherein the rotation position detection unit detects the rotational position of the rotor from a plurality of sine wave signals having a phase difference therebetween.

8. The apparatus according to claim 7, wherein the rotation position detection unit calculates a tangent value from the plurality of sine wave signals, calculates a rotational angle of the rotor by performing arctangent calculation on the tangent value, and integrates the rotational angle, thereby calculating rotational position information of the rotor.

9. The apparatus according to claim 1, further comprising a storage unit configured to store information indicating a relationship between at least either one of the number of rotations of the rotor and a torque to be generated and the first phase difference,
wherein the phase difference setting unit sets the first phase difference based on the stored information.

10. A motor system comprising:
a motor; and
an apparatus comprising at least one processor or circuit programmed to function as:
a rotation position detection unit configured to detect a rotational position of a rotor;
a phase difference setting unit configured to set a first phase difference between the rotational position and a driving waveform;
a changing time setting unit configured to set a changing time, which is a time required for changing the first phase difference from a first phase difference before the change to a first phase difference after the change, in a case where the set first phase difference is changed;
a determination unit configured to determine a second phase difference based on the first phase difference before the change, the phase difference after the change, and the first changing time;
a generation unit configured to generate the driving waveform for a rotor based on the detected rotational position;
an acquisition unit configured to calculate a number of rotations of the rotor; and
a rotations setting unit configured to set a target number of rotations,
wherein the setting unit sets the first phase difference based on a deviation between the acquired number of rotations and the target number of rotations.

11. An imaging apparatus comprising:
a motor system comprising
a motor; and
an apparatus comprising at least one processor or circuit programmed to function as:
a rotation position detection unit configured to detect a rotational position of a rotor;
a phase difference setting unit configured to set a first phase difference between the rotational position and a driving waveform;
a changing time setting unit configured to set a changing time, which is a time required for changing the first phase difference from a first phase difference before the change to a first phase difference after the change, in a case where the set first phase difference is changed;
a determination unit configured to determine a second phase difference based on the first phase difference before the change, the first phase difference after the change, and the changing time;
a generation unit configured to generate the driving waveform for the rotor based on the detected rotational position;
an acquisition unit configured to calculate a number of rotations of the rotor;
a rotations setting unit configured to set a target number of rotations; and
an optical element,
wherein the motor drives the optical element, and
wherein the setting unit sets the first phase difference based on a deviation between the acquired number of rotations and the target number of rotations.

12. A method for controlling an apparatus, the method comprising:
detecting a rotational position of a rotor;
setting a first phase difference between the rotational position and a driving waveform for the rotor;
setting a changing time, which is a time required for changing the first phase difference from a first phase difference before the change to a first phase difference after the change in a case where the first phase difference is changed;

determining a second phase difference between the rotational position and the driving waveform based on the first phase difference before the change, the first phase difference after the change, and the changing time;

generating a driving waveform for the rotor based on the detected rotational position and the second phase difference;

acquiring a number of rotations of the rotor;

setting a target number of rotations; and setting the first phase difference based on a deviation between the acquired number of rotations and the target number of rotations.

13. The method according to claim 12, wherein the determining determines the second phase of the driving waveform according to a timing when the detecting detects the rotational position.

14. The method according to claim 12, wherein the determining determines the phase of the driving waveform so that the second phase difference between the rotational position and the driving waveform changes according to a function from when the first phase difference is changed to when the changing time elapses.

15. The method according to claim 12, wherein the detecting includes calculating a first count value proportional to a rotation amount of the rotor, and calculating a second count value that periodically changes relative to the rotation amount.

16. The method according to claim 10, further comprising storing information indicating a relationship between at least either one of the number of rotations of the rotor and a torque to be generated and the first phase difference, wherein the setting sets the first phase difference based on the stored information.

17. The apparatus according to claim 1, wherein the determination unit determines the second phase difference based on the first phase difference before the change, the first phase difference after the change, the changing time, and an offset value, and wherein the offset value is based on the rotation position and the driving waveform in a stopped state of the rotor.

18. The apparatus according to claim 1, wherein the generation unit generates the driving waveform by adding the detected rotational position and the second phase difference.

19. The apparatus according to claim 1, wherein the changing time at a timing at which the rotor starts to rotate from a stopped state of the rotor is longer than the changing time at a timing at which the rotor starts to decelerate.

20. The apparatus according to claim 1, wherein the changing time is longer than a phase update cycle of the driving waveform.

21. The apparatus according to claim 1, wherein the second phase difference is set to a value between a value of the first phase difference before the change and a value of the first phase difference after the change.

* * * * *